July 10, 1928.
W. S. L. ULRICH
1,676,624
TRACTOR MECHANISM
Filed Nov. 24, 1923
3 Sheets-Sheet 1
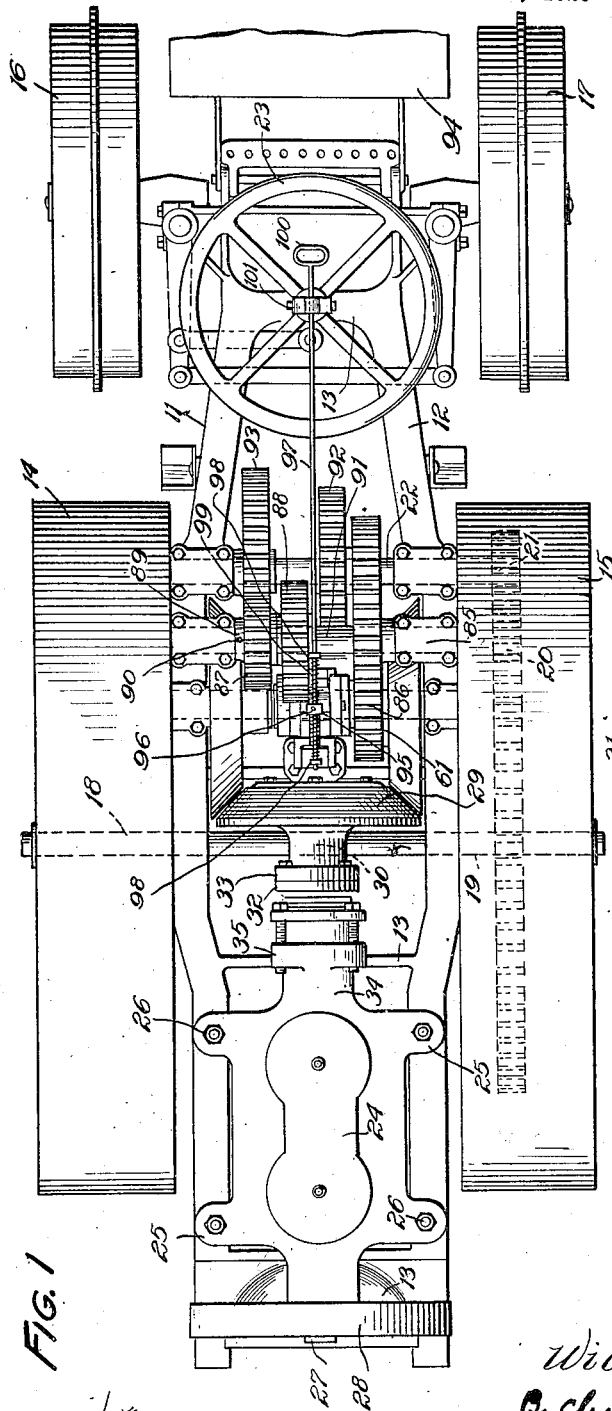
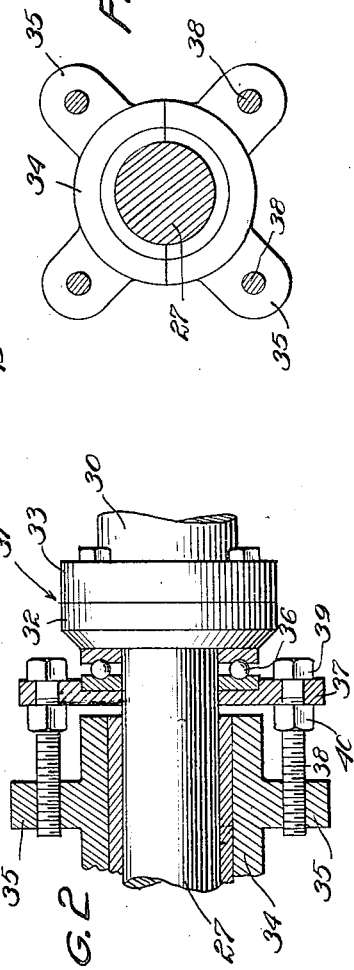
Inventor
William S. L. Ulrich
By Chindahl Parker Carlson
Attys
Witness:
John E. Titus

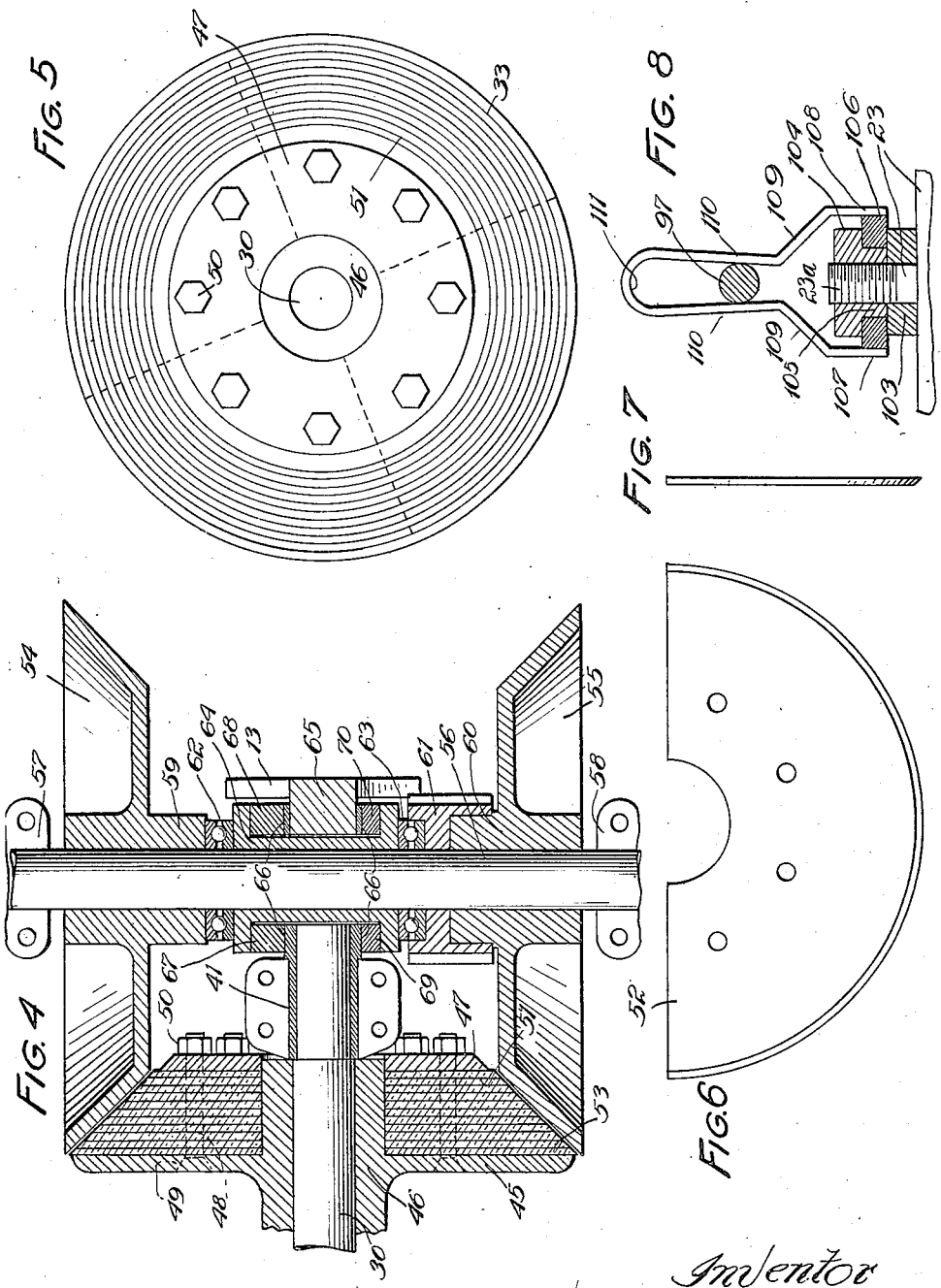

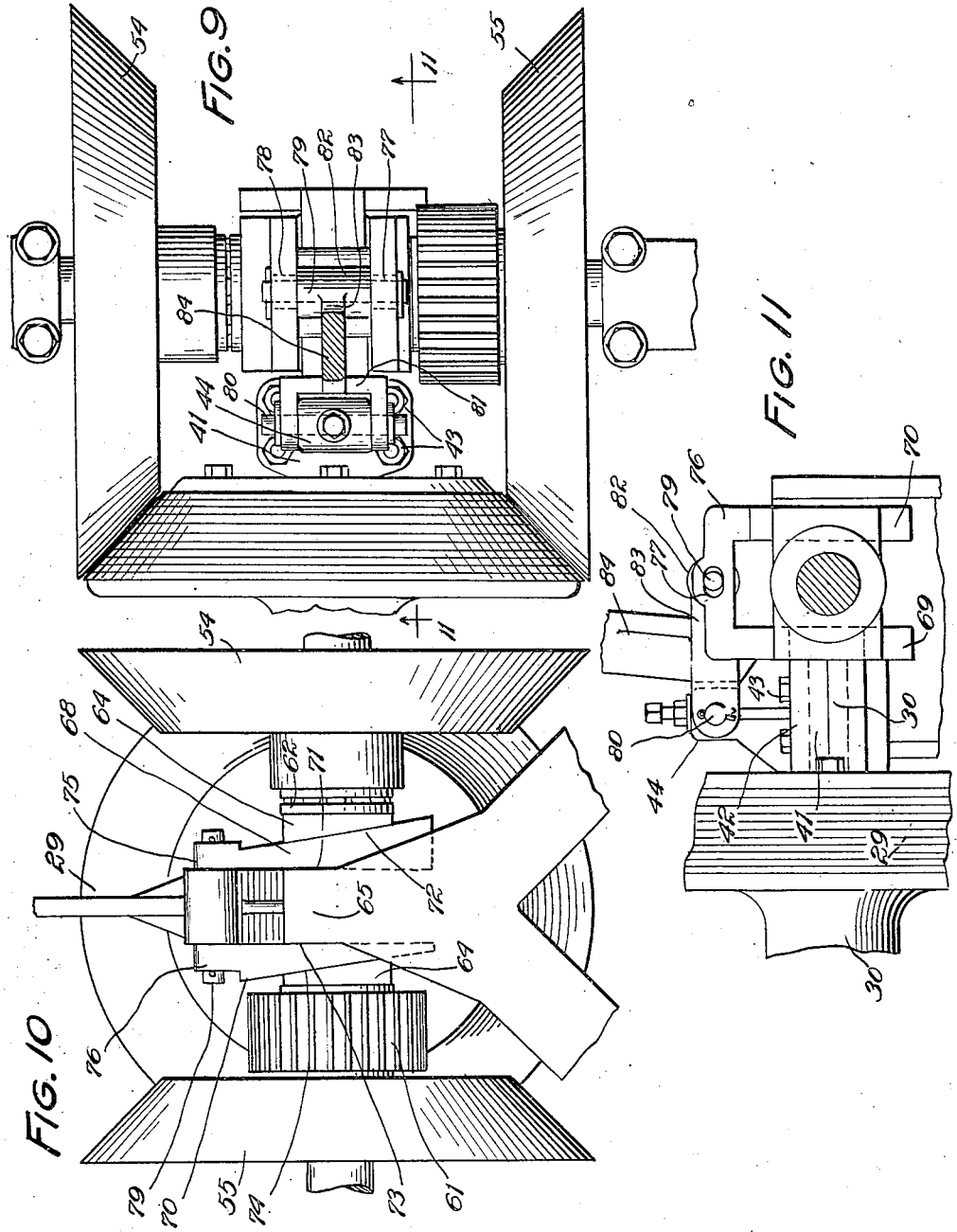

Patented July 10, 1928.

1,676,624

UNITED STATES PATENT OFFICE.

WILLIAM S. L. ULRICH, OF GRAFTON, ILLINOIS.

TRACTOR MECHANISM.

Application filed November 24, 1923. Serial No. 676,811.

This invention relates generally to agricultural tractors and more especially to a driving mechanism for such tractors.

In the type of mechanism used heretofore there have always been parts included which are subject to wear, and which require removal for adjustment to take up the wear. I have provided in my tractor a construction for the mechanism such that the parts subject to wear are reduced to a minimum. Likewise the parts which require such adjustment are so constructed that a single person may readily adjust the parts with simple tools without disassembling the mechanism in any respect.

It is one object of my invention to provide a tractor having a friction drive of such a construction that repair of the friction surface is a simple operation and conservative of friction material.

It is another object of my invention to associate with the friction drive, a special shifting mechanism for forward, stop and reverse motion whereby to simplify the parts generally.

It is still another object to provide a novel adjustable thrust bearing associated with the friction drive to permit a simple adjustment thereof to take up wear caused by the thrust from the friction drive.

Still other and ancillary objects and advantages will appear throughout the following description arising from the construction employed to accomplish the major purposes of the invention.

Generally my mechanism comprises a cone friction gear driven directly from the motor through the trust bearing. An endwise movable shaft carries two cone friction gears adapted to engage the first cone gear to transmit power in either direction through suitable gearing to the driving wheels. The means for controlling the endwise motion of the shaft is a double wedge construction operated by a control lever.

In the accompanying drawings showing one embodiment of my invention I have included the mechanism in a tractor embodying a special frame construction more particularly described in my application Ser. No. 676,810.

Fig. 1 illustrates a plan view of the whole tractor and mechanism.

Figs. 2 and 3 are detailed views of my adjustable thrust bearing.

Fig. 4 illustrates a horizontal section of the friction driving mechanism.

Figs. 5, 6, and 7 show details of the construction of the cone friction gear.

Fig. 8 shows a view of the control lever clamp on the steering wheel.

Fig. 9 shows a plan view of the shifting device as related to the friction drive.

Fig. 10 shows a view of the shifting mechanism looking at Fig. 9 from the right.

Fig. 11 shows a view of the shifting mechanism looking on the plane of line 11—11 of Fig. 9.

In the drawings the tractor frame illustrated comprises the two side members 11 and 12 with suitable cross webs 13, the driving wheels 14 and 15 and the guide wheels 16 and 17. According to the arrangement of the tractor described in my application Ser. No. 676,810 each driving wheel may have a separate axle as 18 and 19 and a bull gear 20 meshing with a driving pinion 21, the latter being located on a common drive shaft 22 in the gear mechanism of the tractor. Suitable construction is provided in the tractor for the operation of the guide wheels 16 and 17 by the steering wheel 23, the details of which form no part of this invention.

The forward part of the tractor carries a motor 24 which may be of any suitable type. In the present instance the motor employed has side lugs 25 which rest upon the frame members 11 and 12 and are secured thereto by bolts 26. This construction tends to strengthen the frame horizontally.

The motor has a crank shaft 27 longitudinally disposed with regard to the tractor, having on one end a fly wheel 28 and having the other end engaging with a shaft in the mechanism. I have provided the tractor with a large friction gear 29 of the cone type on a shaft 30 which abuts the shaft 27. This abutting arrangement results in a thrust from the cone gear. In positioning the abutting shafts 27 and 30 a flexible connector 31 of any common construction may be used. This is generally illustrated by the parts 32 and 33 forming the flexible connector on the shafts 27 and 30 respectively. Ordinarily in this type of power transmission, a suitable thrust bearing is interposed to take the end thrust before the force thereof enters the motor. I have provided a means for doing this which is adjustable without removing the parts. The motor 24 has a bearing 34 which is fitted with lugs 35. These lugs receive the force of the thrust finally. The moving parts take the thrust through a ball bearing 36, one side of which receives the pressure from the flexible joint member 32, the other side transmitting the pressure to a ring plate 37 adjustably mounted with reference to the motor lugs 35. The means for mounting the ring 37 are ordinary bolts 38 with heads 39 and nuts 40. The bolts are threaded into the lugs 35 and the nuts 40 serve as clamping or locking nuts which hold the plate 37 in place after adjustment is made.

The cone friction gear 29 on shaft 30 rests in bearing 41 in the frame. Bearing 41 has a fitted cap 42 secured by bolts 43. The cap extends upwardly into a bearing lug 44 for a purpose to be described more fully hereinafter. As to the cone gear itself, I have provided a construction therefor which enables any unskilled person to renew the friction surface with little effort and with a minimum of wasted material. The cone comprises a plurality of laminations, preferably of paper. Heretofore, gears of this character have used annular disks for the laminations, which form compels one to remove the wheel or to remove a face plate from the wheel in order to renew the disks. I have provided my wheel with disks which are built up from suitable segments which permit their insertion into the wheel without removal of the end plate. I prefer to use two semi-circular segments to constitute one disk. Using this form the following arrangement of the parts is adopted. Alternate disks are similarly formed in the gear with the semi-circular parts in alinement. The intermediate disks are likewise all in alinement but staggered as to the first mentioned set, preferably at 90°. In using 90° as the staggering angle, there are produced four similar segments in the cone gear. The gear shown comprises two cast iron faces secured together by bolts between which faces the segments are clamped. One face 45 is fixed with respect to the shaft by any preferred construction, in the present instance being integral with a hub 46 upon which the other face 47 is slidable. Bolts 48 with the heads 49 set in the fixed face, clamp the faces together by means of the nuts 50. The bolts 48 are disposed circumferentially about the gear and are in number preferably some multiple of four so that the four similar segments have bolt holes similarly located therein. In the present instance there are two bolts in each quarter section. In replacing the gear, all the bolts are loosened, and those in one half removed. The smallest segment 51 is then removed from this half and a new and large segment 52 put in behind the former largest segment 53. The bolts are again replaced, the gear turned over and the operation repeated. The bolts are then all tightened and the surface edges trimmed down to the desired form. However, it is obvious that when a disk is used having other than two similar segments, as for instance $n$ similar segments, there will be in the wheel $2^n$ sections formed by the staggering of adjacent disks, so that in order that the holes in each segment shall be similar, each section will be similar and have at least one hole. By this arrangement each segment has a number of holes therein which is some multiple of $2^n$.

The bevel wheels which engage the friction gear in my invention are two in number rigidly secured on the same shaft, sufficiently spaced apart so that neither will contact the cone gear 29. With this construction the shaft must be movable endwise and fixed in position to produce contact between the friction gear and either bevel wheel. I provide in my invention a novel means for moving the shaft endwise to accomplish this as will appear from the following description of the form disclosed in the drawings.

The two bevel wheels are relatively large in diameter to give a large surface for friction engagement. These wheels 54 and 55 are of cast iron and the metallic surface engages the paper surface of the cone gear 29. The endwise movable shaft 56 rests in suitable bearings 57 and 58 in the frame of the tractor. The wheels of the drawings have hub portions 59 and 60 which are rigidly fixed to the shaft. Suitable transfer gearing is provided rigid with the shaft 56. This gearing may be cut in one of the hubs 59 or 60, but is herein shown as a separate gear 61 in the form of a toothed cap over the hub 60 functioning as a sort of extension of the hub 60, which, it will be observed, is shorter than the hub 59. Ring ball bearings 62 and 63 are provided adjacent the hubs to take the thrust of a block 64 about the shaft between the ball bearings 62 and 63. This block is held against rotation with the shaft and is provided with means to move it laterally in the direction of the shaft. The means provided is of a wedge construction, acting as a wedge in either direction of thrust. In order to produce equal forces on the block a symmetrical construction is used requiring in the present instance four wedges.

In the construction above described the bearing 41 for the cone gear is central of the tractor and is so close to the shaft 56 and in line therewith horizontally that a vertical recess is cut in the block 64 to accommodate it. A similar recess is provided on the opposite side of the block and also a frame block 65 secured to or built in the frame web 13 to correspond to the end of bearing 41. The block 64 thereby becomes an H-block with the shaft 56 passing through both sides centrally of the H. The sides of the end of bearing 41 and the sides of the block 65 are babbitted as shown by 66, these sides being vertical bearings for suitable wedges 67, 68, 69 and 70. These wedges are arranged in duplicate pairs. Wedges 67 and 68 (Figs. 4 and 10) are similarly provided with vertical sides 71 to engage the babbitted sides 66 and with bevelled sides 72 to engage the side of the H-block 64, which has similar bevelled sides 72. The bevel sides 72 extend downwardly away from the center of the tractor so that on raising the wedge the shaft 56 and bevel wheels are moved positively endwise to the right in Fig. 10.

Wedges 69 and 70 are similarly provided with vertical sides 73 and bevelled sides 74, the H-block 64 being at the other end bevelled at 74 to extend parallel to the opposite side 72 and downward toward the center of the tractor. Lowering the wedges 68 and 70 produces a positive thrust to the left in Fig. 10 on the endwise movable shaft 56. Hence it is obvious that moving all these wedges together moves the shaft 56 positively in either direction and maintaining the wedges fixed maintains the shaft fixed. In this manner the shaft is positioned to receive power in either direction, or not at all, to control the motion of the tractor.

The means for accomplishing the raising and lowering of the wedges is a simple lever construction. Wedges 67 and 68 are parts of a single yoke 75 and wedges 69 and 70 are parts of a single yoke 76, yoke 75 being the one with inverted wedges. Centrally of the yokes is a slot 77 in one and 78 in the other in alinement with a pin or rod 79 passing therethrough. In the head or lug 44 previously referred to as located in the cap of bearing 41 is a horizontal pivotal pin 80 securing a yoke member 81 thereto. The yoke member is pivotally movable to raise and lower the wedges through the pin 79. The pin 79 is held in a head 82 rigid to the yoke 81 by a bracket or arm 83 extending between them. Extending uprightly from the arm 83 and rigidly a part thereof is a control arm 84 which is movable about the pivot 80 by any suitable connection near the hand of the operator to control the power connections of the tractor.

The mechanism connecting the gear 61 to the tractor wheels may be any suitable gearing transmitting the power thereto. For this purpose I have shown the following: The frame carries a shaft 85 with a spur gear 86 adapted to mesh with the gear 61 on the sliding shaft. Gears 87 and 88 of different diameters are mutually rigid on a splined sleeve 89 on the shaft 85, the gears being shown in adjacent position. The splined sleeve is held against rotation by a suitable key (not shown) and is further held against longitudinal motion by a set screw 90. The sleeve is slidable to displace the gear 88 to position 91 on the shaft 85 in which position it will mesh with a gear 92 rigid on shaft 22. In the position shown gears 88 and 92 are out of mesh, but gear 87 is in mesh with a gear 93 also rigid on shaft 22. By this arrangement two speeds are possible in the mechanism, controlled by the setting of the screw 90. In place of the latter any other well known means may be provided for shifting the gears, but I prefer this arrangement since all danger of stripping gears is eliminated.

The accommodations provided for the operator include a seat 94 at the rear of the tractor, the steering wheel 23 and a suitable means to control the mechanism through the aforesaid lever 84. The lever 84 extends upwardly terminating in a head 95 having a hole 96 horizontally therethrough. Passing through this hole is a rod 97 having a resilient engagement with the lever 84. This is obtained by providing on the rod 97 suitable heads or enlargements 98 on each side of the lever head 95. Interposed between the lever head 95 and the heads 98 are compressed springs 99. The rod 97 extends toward the operator to a suitable locking device, terminating in a handle 100 directly in line with the steering wheel center, at which it passes through a swivel clamp 101 thereon (Fig. 8). The steering wheel shaft 23$^a$ is threaded at the top, and a washer 103 placed over the wheel 23. A gland nut 104 holds the wheel securely to the shaft. The nut 104 provides a recess between its head and washer 103, the lower part 105 of the nut 104 being circular in cross-section to serve as a pivot. A suitable swivel means is provided about the portion 105 as the plate 106. Extending upwardly from the swivel plate 106 I provide a retaining means for the control rod 97. The nature of this may vary, but I prefer to use the spring clamp shown. This is substantially a U-shaped spring member secured to the swivel plate at the ends 107 and 108 extending upwardly therefrom to a position just above the nut 104. At this place each arm branches inwardly and then again slightly outwardly, as shown at 109 and 110 respectively, the top of the member having an opening larger than the rod 97, as the portion 111. Between the two portions 110 the rod is pinched to secure it against longitudinal movement. It is thus seen that very slight adjustments can be made in the position of the control rod to vary the friction pressure between the cone friction gears of the mechanism.

While I have illustrated and described an exemplary embodiment of my invention, I do not wish the invention to be limited by the drawings and the description thereof, but desire to include all modifications and embodiments of the invention which are comprehended in the appended claims.

I claim as my invention:

1. A tractor driving mechanism comprising, in combination, a motor having its shaft longitudinally of the tractor, a friction cone gear at the end of said shaft, a thrust bearing on the shaft adjacent the motor, a second shaft movable endwise and disposed at right angles to the first shaft, two bevel wheels rigid with said second shaft spaced apart so that said wheels may be free from contacting the friction cone gear, a block on said shaft longitudinally rigid therewith, a wedge arranged to move said block in one direction to shift the shaft endwise, whereby one of said bevel wheels engages the friction gear, a relatively inverted wedge arranged to move the block to shift the shaft in the other direction, whereby the other bevel wheel may be made to mesh with the friction gear to reverse the rotation of the movable shaft, means to move said wedges, a gear on the movable shaft, and other gears arranged to mesh therewith to drive the tractor wheels.

2. A tractor driving mechanism having, in combination, a power shaft, a friction cone on said shaft, a driven shaft, two bevel wheels rigid on the driven shaft and adapted to engage one at a time the friction cone, a plurality of wedges, means retained on said shaft against longitudinal movement relative thereto and adapted to be engaged by said wedges to move said shaft positively in both directions endwise, means to hold said wedges in adjusted position, and other power transfer means from the driven shaft to the driving wheels of the tractor.

3. A power transmission having, in combination, a friction cone, a shaft, an engaging bevel wheel carried by said shaft and movable axially to engage the cone, a part on said shaft movable axially therewith, a wedge adapted to engage said part on the shaft to move the wheel in one direction, an inverted wedge rigid with the first wedge and engaging said part on the shaft to move the wheel in the opposite direction, and means to adjust the position of said wedges.

4. A power transmission having, in combination, a friction cone gear, a driven shaft and a bevel wheel thereon engaging the friction wheel, the bevel wheel being non-rotatable on the shaft, a block rigid with the wheel longitudinally of the shaft, the block having parallel bevelled surfaces, perpendicular to a plane containing the shaft, a wedge device movable between the bevel surfaces parallel to said plane, the wedge device having bevelled surfaces adapted to engage the first mentioned surfaces to move the wheel positively axially in either direction, and means to maintain the movable wedges in a fixed path.

5. A power transmission device having, in combination, a frame, an endwise movable shaft in the frame arranged to be shifted to control the power transmission, a shifting device comprising, in combination, a block rotatable relative to the shaft, means to secure the block fixed longitudinally relative to the shaft, the block having a recess on one side of the shaft, a part on the frame projecting into said recess to hold the block non-rotatable with respect to the frame, the ends of the recess extending laterally beyond the block on both sides whereby the block and shaft are slidable with respect to the frame, the lateral sides of said recess having parallel bevel surfaces, the block having mutually parallel side faces facing the bevelled surfaces of the recess, and rigid wedges filling the end portions of the recess, the wedges being movable therein to shift the block and shaft longitudinally.

6. A tractor driving mechanism having, in combination, a driven friction cone, a shaft to be driven, an engaging bevel wheel rigid on said shaft and movable axially therewith to engage the friction cone, means retained on said shaft against relative longitudinal movement, said means having thereon a pair of spaced complementary beveled surfaces, a wedge adapted to engage one surface to move the engaging wheel in one direction, an inverted wedge rigid with the first wedge engaging the other of said beveled surfaces to move the wheel in the opposite direction, and means to adjust the position of said wedges.

In testimony whereof, I have hereunto affixd my signature.

WILLIAM S. L. ULRICH.